(12) United States Patent
Pontual et al.

(10) Patent No.: US 7,738,768 B1
(45) Date of Patent: Jun. 15, 2010

(54) METHOD AND APPARATUS FOR INCREASING THE QUALITY OF SERVICE FOR DIGITAL VIDEO SERVICES FOR MOBILE RECEPTION

(75) Inventors: Romulo Pontual, Larchmont, NY (US); Roger Lambert, Pacific Palisades, CA (US); Hanno Basse, Santa Monica, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1107 days.

(21) Appl. No.: 11/305,853

(22) Filed: Dec. 16, 2005

(51) Int. Cl.
*H04N 7/00* (2006.01)
*H04N 7/26* (2006.01)

(52) U.S. Cl. .................................. 386/46; 386/124
(58) Field of Classification Search .............. 386/46, 386/83, 124, 1, 52, 113
See application file for complete search history.

(56) References Cited

U.S. PATENT DOCUMENTS

| 5,349,667 | A | | 9/1994 | Kaneko |
| 5,418,658 | A | * | 5/1995 | Kwon ........................ 360/48 |
| 5,995,462 | A | * | 11/1999 | Harold-Barry ............ 369/53.18 |
| 6,078,305 | A | | 6/2000 | Mizutani |
| 6,185,221 | B1 | | 2/2001 | Aybay |
| 6,665,751 | B1 | | 12/2003 | Chen et al. |
| 6,711,181 | B1 | | 3/2004 | Xue et al. |
| 6,925,606 | B2 | | 8/2005 | Shaw et al. |
| 2002/0059499 | A1 | | 5/2002 | Hudson |
| 2002/0116517 | A1 | | 8/2002 | Hudson et al. |
| 2003/0115043 | A1 | | 6/2003 | Wiese et al. |
| 2004/0064573 | A1 | | 4/2004 | Leaning et al. |
| 2005/0120128 | A1 | | 6/2005 | Willes et al. |

FOREIGN PATENT DOCUMENTS

| EP | 0886217 | 12/1998 |
| JP | 2003241979 | 8/2003 |
| WO | WO 99/52067 | 10/1999 |
| WO | WO 01/31497 | 5/2001 |
| WO | WO 01/54116 | 7/2001 |

* cited by examiner

*Primary Examiner*—Robert Chevalier

(57) ABSTRACT

A system for playing a digital signal is set forth that includes a receiver receiving a digital signal. System further includes a buffer storing the digital signal in a buffer. A controller determines a read rate and when the signal is interrupted. When the buffer is full, the buffer is read at about the input rate of the buffer. When the buffer is less than full, the buffer is read at a rate less than the input rate when the digital television signal is interrupted.

24 Claims, 1 Drawing Sheet

METHOD AND APPARATUS FOR INCREASING THE QUALITY OF SERVICE FOR DIGITAL VIDEO SERVICES FOR MOBILE RECEPTION

TECHNICAL FIELD

The present invention relates generally to digital satellite services, and more particularly, to a method and apparatus for displaying digital signals during a signal interruption which is particularly suited for mobile applications.

BACKGROUND OF THE INVENTION

Satellite television is becoming increasingly popular due to its wide range of programming selection and digital quality. Mobile applications for digital television are also becoming increasingly popular. A mobile application for receiving digital television provides a rotating antenna that can "follow" the satellite as the vehicle moves.

One problem with mobile satellite applications is that obstructions may cause signal interruptions. Such obstructions include tall buildings and tunnels. In current applications, when the signal is interrupted, the display is immediately interrupted and thus the viewer's entertainment experience is diminished.

It would therefore be desirable to provide a method and apparatus for enhancing the viewer's experience and minimize the disruption of the video entertainment.

SUMMARY

The present invention provides a buffer to help minimize video playback disruption during a signal interruption.

In one aspect of the invention, a method of operating a video system includes receiving a digital television signal, storing the digital television signal in a buffer, determining a signal interruption, retrieving the signal from the buffer at a first rate when no signal interruption is present, and retrieving the signal from the buffer at a second rate less than the first rate during signal interruption.

In a further aspect of the invention, a system for playing a digital signal is set forth that includes a receiver receiving a digital signal. The system further includes a buffer storing the digital signal in a buffer. A controller determines a read rate and when the signal is interrupted. When the buffer is full, the buffer is read at about the input rate of the buffer. When the buffer is less than full, the buffer is read at a rate less than the input rate when the digital television signal is interrupted.

One advantage of the invention is that user's experience is enhanced by providing a higher quality display output during an interruption. That is, by controlling the buffer speed a less noticeable signal interruption than a blank screen is provided to the user.

Other advantages and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
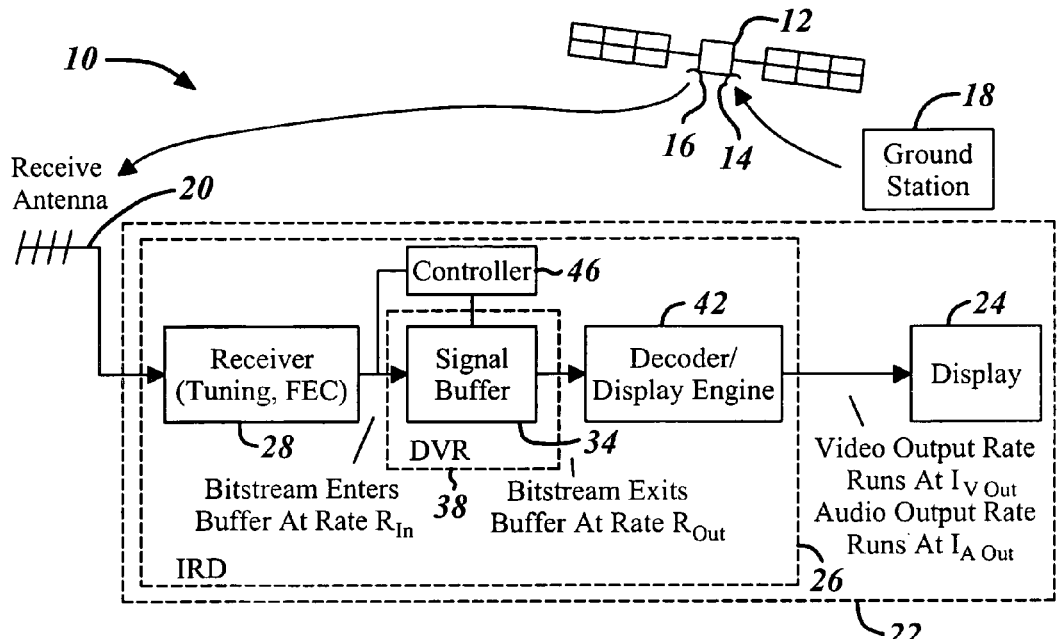
FIG. 1 is a block diagrammatic view of the system according to the present invention.

In the following figures the same reference numerals will be used to illustrate the same components. The following description is set forth with respect to an automotive vehicle. However, the teachings of the present application are suitable for various types of mobile television display units.

Figure 2:
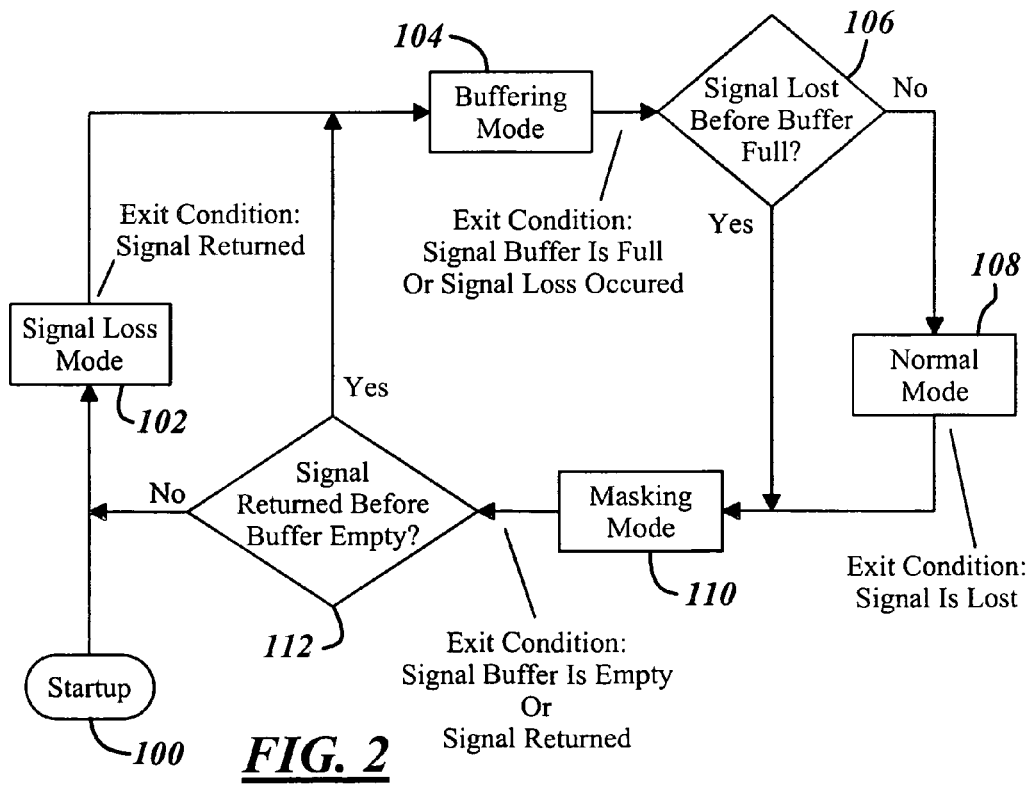
FIG. 2 is a flow chart illustrating a method for operating the present invention.

Referring now to FIG. 2, a satellite system 10 is illustrated that includes a satellite 12 having a receiving antenna 14 and a transmitting antenna 16. The receiving antenna 14 receives signals from a ground station 18 such as television signals. The satellite 12 through transmitting antenna 16 transmits signals to an antenna 20. Antenna 20 may be disposed on an automotive vehicle 22. The automotive vehicle 22 includes a display 24 therein. The display 24 may operate on analog or digital signals to display various television signals received from the antenna 20. The antenna 20 and display 24 are coupled to an integrated receiver decoder (IRD) 26. The IRD 26 may include various features including a receiver 28 that receives a digital signal from the antenna 20. The receiver 28 comprises a tuner, demodulator, and forward error correction circuitry. The output of the receiver is a digital bitstream containing video and audio data. The video and audio data may be compressed. The receiver 28 is coupled to a signal buffer 34. The bitstream from the receiver 28 is received at a rate of $R_{IN}$ which is equal to the transport rate of the bitstream. The signal buffer 34 may be of various sizes and may be formed from various types of memory. For example, the signal buffer may be part of a digital video recorder 38. The signal buffer provides first-in/first-out of processing. As will be described below, the rate that the digital bitstream is read out of the signal buffer may be varied. The rate $R_{OUT}$ equals $c*R_{IN}$ where c is less than or equal to 1. The delay factor c forces the read rate of the buffer to be slower or equal to the write rate into the buffer 34. The factor c influences the rate at which the decoder/display engine block can process the digital bitstream. It needs to be selected such that the subjective quality of the displayed video/audio signals are not noticeably impaired. Typical values for c may be 0.7-1.0.

The signal buffer 34 is coupled to a decoder/display engine 42. The decoder/display 42 engine decodes the digital bitstream if it is compressed and the display engine converts the digital bitstream into an analog or digital signal suitable for use in the display.

A controller 46 is used to monitor the incoming digital bitstream to detect, among many things, whether the incoming digital stream has been interrupted. To determine if the signal has been interrupted the tuner lock may be monitored (no locks no signal), a signal strength meter may be monitored, the bit error rate may be monitored, and the buffer input rate may be monitored. Also, the controller 46 monitors the condition of the signal buffer to determine whether or not it is full. The controller 46 also controls the output and determines what value to place in the factor to slow down the output to mask longer signal outage times. The controller 46 controls the various modes including the four modes of operation of the present invention. The four modes are a buffering mode, normal mode, a masking mode, and a signal loss mode.

It should be noted that the frame rate of the displayed video signal varies in direct proportion with the delay factor. For example, if a video sequence was captured at a frame rate of 29.97 Hz, with a delay factor of c=0.95, the actual frame rate for playout would yield 28.47 Hz. The accompanying audio signal may also need to be played at a proportionally reduced rate as well. This can be achieved by varying the sampling rate of the audio signal. Algorithms presently exist to process the audio signals presented at lower sampling rates then upconvert them to the normal sampling rate through interpolation and pitch correction.

Referring now to FIG. 2, a flow diagram of the system is illustrated. In step 100, the system is started at startup. In step 102, the system enters a signal loss mode. The signal loss mode is entered for a brief period of time. The time period may be large enough to allow the buffer to completely empty. The system leaves the signal loss mode when the signal is returned. The system then enters a buffering mode in step 104. The buffering mode 104 allows the buffer memory to fill and the output rate is less than the input rate. This is caused by providing a delay factor (c) less than 1. The video and audio may be displayed at slightly lower than the intended rate. Once the signal buffer is full or a signal loss occurred, block 104 is exited and step 106 is executed in which the system determines whether the signal has been lost before the buffer is full. If the signal has not been lost before the buffer was full, step 108 is executed in which the normal mode is entered. In normal mode, the delay factor is set to 1, making the read rate equal to the write rate ($R_{OUT}=R_{IN}$). This ensures a constant buffer fullness. In this mode the frame rate of the video as well as the audio sampling rate run at their nominal speeds as set by the signal source. If the signal has been lost in normal mode, step 110 is executed. Also, if the signal has been lost before the buffer was full in block 104, block 106 directs the system to step 110.

In step 110, a masking mode is entered. In masking mode, the system reads the stored data from the signal buffer. This can be done at either nominal speed ($R_{OUT}=R_{IN}$) or at a reduced rate ($R_{OUT}=c*R_{IN}$). When c is less than 1, the signal may be sustained for a longer time through the decoder/display engine. Thus, longer masking is available. In step 110, once the signal buffer is empty, or the signal is returned, the masking mode is exited. In step 112, if the signal has returned before the buffer was empty, the buffering mode is entered in step 104. If the signal is not returned before the buffer is empty, then step 102 is again executed which provides the signal loss mode.

There will be a discontinuity in the signal buffer which occurs at the time the system returns from masking mode to the buffer mode. When this portion of the signal in the buffer reaches the decoder/display engine, there will be a noticeable impact on the video and audio playback. This impairment will be very short and presents a far better experience to the user than a completely blank, black, or frozen image during the entire duration of the outage. In a sense, this will be like a slight slip in a DVD player output. When the signal does not return before the signal buffer is empty, the system waits for the signal to return. This may take place during an extended tunnel or the like.

The size of the signal buffer determines how long an outage can be masked. Time is determined by $t_m = BS/R_{OUT}$, where $t_m$ is the masking time in seconds BS is the buffer size in bits $R_{OUT}$ is the buffer read rate in bits per second Since ROUT=c*RIN then tm=BS/(RIN*c).

Since c is close to 1, the approximate masking time can be determined by the ratio of the buffer size and the transport rate of the digital signal.

For example, if the transport rate of the signal was 6 Mbps, a signal buffer size of 360 Mb is needed to mask outages with a duration of up to 1 minute.

The largest possible outage duration may be covered if the system was in normal mode when the signal was lost. That is, the largest possible outage may be sustained when the signal buffer was full. If the system enters the masking mode directly from the buffering mode, the maximum outage duration that can be masked depends on how full the buffer was at the time of the signal loss.

Upon channel changes, the system turns to the startup condition so that the signal buffer is flushed and filled with the digital stream from the newly selected channel.

While particular embodiments of the invention have been shown and described, numerous variations and alternate embodiments will occur to those skilled in the art. Accordingly, it is intended that the invention be limited only in terms of the appended claims.

What is claimed is:

1. A system for buffering a digital signal comprising:
a receiver receiving the digital signal;
a buffer storing the digital signal in a buffer; and
a controller determining a read rate for the buffer and determining when the signal is interrupted, when the buffer is full, reading the buffer at first read rate of about the input rate of the buffer, when the buffer is less than full, reading the buffer at a second read rate, and when the digital signal is interrupted, reading the buffer at a third read rate.

2. A system as recited in claim 1 wherein the second read rate is less than the input rate but greater than zero.

3. A system as recited in claim 1 wherein the third read rate is less than the input rate but greater than zero.

4. A system as recited in claim 1 further comprising a display, wherein the controller displays the digital television signal at the input rate or second rate.

5. A system as recited in claim 1 wherein the display comprises a display disposed within a vehicle.

6. A system as recited in claim 1 wherein the buffer comprises a digital video recorder.

7. A system as recited in claim 1 wherein the digital signal comprises a digital television signal.

8. A method of operating a video system comprising:
receiving a digital television signal;
storing the digital television signal in a buffer;
determining a signal interruption;
retrieving the signal from the buffer at a first rate when no signal interruption is present; and
retrieving the signal from the buffer at a second rate less than the first rate but greater than zero during the signal interruption.

9. A method as recited in claim 8 wherein receiving the digital television signal comprises receiving the digital television signal from a satellite.

10. A method as recited in claim 8 wherein receiving the digital television signal comprises receiving the digital television signal with an antenna on a mobile vehicle.

11. A method as recited in claim 8 wherein storing the digital television signal comprises storing the digital television signal when the buffer is not full.

12. A method as recited in claim 8 wherein the signal interruption comprises changing a channel.

13. A method as recited in claim 8 wherein the signal interruption comprises an obstructed signal.

14. A method as recited in claim 8 further comprising decoding the digital television signal prior to displaying.

15. A method as recited in claim 8 further comprising converting the digital signal to an analog signal prior to displaying.

16. A method as recited in claim 8 wherein prior to determining a signal interruption, entering a buffering mode when the buffer is not full by reading at a rate lower than an input rate.

17. A method of operating a mobile video system comprising:

receiving a digital television signal through a mobile antenna;

storing the digital television signal in a buffer;

determining a signal interruption;

retrieving and displaying the signal from the buffer at a first rate when no signal interruption is present; and retrieving and displaying the signal from the buffer at a second rate less than the first rate but greater than zero during a signal interruption.

18. A method as recited in claim 17 wherein retrieving the digital television signal comprises receiving the digital television signal from a satellite.

19. A method as recited in claim 17 wherein retrieving the digital television signal comprises receiving the digital television signal with an antenna on a mobile vehicle.

20. A method as recited m claim 17 wherein the antenna comprises a satellite antenna.

21. A method as recited in claim 17 wherein storing the digital television signal comprises storing the digital television signal when the buffer is not full.

22. A method as recited in claim 17 wherein the signal interruption comprises changing a channel.

23. A method as recited in claim 17 further comprising decoding the digital television signal prior to displaying.

24. A method as recited in claim 17 further comprising converting the digital signal to an analog signal prior to displaying.

* * * * *